(12) United States Patent
Adam et al.

(10) Patent No.: US 6,794,486 B2
(45) Date of Patent: Sep. 21, 2004

(54) PROCESS FOR REMOVING A DITHIOCARBONYL GROUP AT THE END OF A POLYMER CHAIN

(75) Inventors: Herve Adam, Princeton, NJ (US); Wan-Li Liu, Belle Mead, NJ (US)

(73) Assignee: Rhodia Chimie, Boulogne Billancourt Ceded (FR)

(*) Notice: Subject to any disclaimer, the term of this patent is extended or adjusted under 35 U.S.C. 154(b) by 23 days.

(21) Appl. No.: 10/366,127

(22) Filed: Feb. 13, 2003

(65) Prior Publication Data

US 2003/0166790 A1 Sep. 4, 2003

Related U.S. Application Data

(60) Provisional application No. 60/358,073, filed on Feb. 19, 2002.

(51) Int. Cl.$^7$ .................................................. C08F 6/00
(52) U.S. Cl. ........................................ 528/480; 210/749
(58) Field of Search ........................... 210/749; 528/480

(56) References Cited

U.S. PATENT DOCUMENTS 5,827,797 A * 10/1998 Cass et al. .................. 505/430

* cited by examiner

Primary Examiner—Terressa Boykin

(57) ABSTRACT

The invention relates to a process for removing a dithio group comprised at the end of a polymer chain, comprising the step of reacting a polymer comprising a dithio group at least one chain-end, with an amine compound, different from triethanol amine, in an organic solvent.

29 Claims, No Drawings

PROCESS FOR REMOVING A DITHIOCARBONYL GROUP AT THE END OF A POLYMER CHAIN

CROSS REFERENCES TO RELATED APPLICATIONS

This application claims the priorities under 35 U.S.C. 119 and/or 365 to Ser. No. 60/358,073 filed in the United States on Feb. 19, 2002, the entire content of which is hereby incorporated by reference.

BACKGROUND OF THE INVENTION

The invention relates to a process for removing a dithio group comprised at the end of a polymer chain.

Dithio groups, bonded to an organic compound, usually confer to said compound a bad smell. The smell is at least partly due to the sulfur atoms. Polymer bearing dithio groups usually present such a bad smell. They often also present a yellow color. Such a smell and such a color may prevent their use in different fields. The smell is also an issue for the people who handle these polymers.

On another hand, dithio groups are reactive groups. Such reactivity may prevent the use of polymers comprising said groups, because it may induce some side reactions.

Recently, new radical polymerization processes involving the use of transfer agents comprising a dithio group have been developed. These processes are especially suitable for making random, block, star, branched or dendritic copolymers, and preferably di-block or tri-block copolymers. These processes are very economical, and can be used for making a number of different polymers or copolymers, that present very interesting properties. Block copolymers for example may be used for many purposes. Either the color, the smell, or the reactivity of the dithio groups may be a drawback for some uses.

Hence, there is a need for processes allowing a dithio group to be removed from polymers, or at least to be deactivated.

Patent application 01 11494, filed in France on Sep. 5, 2001, describes pyrolyzing a polymer comprising a Xanthate end-chain group, to transform said Xanthate group in a thiol group. The pyrolysis is performed in dichlorobenzene, above its boiling point. However, subjecting a polymer to such a temperature may be troublesome, and may alter it. Another process is therefore needed.

Patent application 01 11496, filed in France on Sep. 5, 2001, describes reacting a dithio group comprised in a polymer, with an organic compound comprising a hydrogen atom and a free-radical source.

It is known that hydrolyzing a polymer comprising a dithio group may remove said group. Hydrolysis of block copolymers is for example described in published U.S. patent application Ser. No. 2001-0044498-A1. However such a process is not suitable for some polymers, since it may degrade the polymer itself. For example a hydrolysis process may hydrolyze esters of acrylic acid units comprised in a polymer, as described in the above-mentioned application. Moreover, whereas hydrolysis, performed in water, may remove a dithio group, it may still be difficult or expensive to separate the dithio group by-products from the polymer. Hence, the recovered polymer may comprise said by-products and still present a bad smell and/or color.

Applicants have found an alternative process to the above-mentioned processes, in particular an alternative process to hydrolysis in water, for removing a dithio group from a polymer. In particular embodiments the process prevents undesired reactions (hydrolysis) of units comprised in the polymer such as acrylic esters units and/or avoids difficult separations steps to separate the polymer from dithio groups by-products, and leads to odorless and/or colorless polymers.

The invention also relates to a process for making a polymer or copolymer comprising a living radical polymerization step with a transfer agent comprising a dithio group, and a step of removing said group, these two steps being performed in a same solvent liquid medium. The process according to the invention is hence very simple. In particular embodiments, such a process allows together the removal of the dithio group and the separation of the polymer from the by-products. In such embodiments, the invention provides a very simple and cost-effective process addressing the color and/or the smell issues.

BRIEF SUMMARY OF THE INVENTION

Applicants have found a new process for removing dithio groups at the end of a polymer chain. The process may be a step in a process for making polymers or copolymers, comprising, before, a step of polymerizing.

The invention relates to a process for removing a dithio group comprised at the end of a polymer chain, comprising the step of reacting a polymer comprising a dithio group at at least one chain-end, with an amine compound, different from triethanol amine, in an organic solvent.

In a second aspect, the invention relates to a process for making a polymer or copolymer comprising the steps of:

a) polymerizing monomers by a living radical polymerization involving a transfer agent comprising a dithio group, to obtain a polymer or a copolymer comprising a dithio group at at least one chain-end, the polymerization being carried out in a solvent wherein the monomers and the obtained polymer or copolymer are soluble, and b) in the step a) solvent, reacting the polymer or copolymer with an amine compound, different from triethanol amine, soluble in the solvent.

By dithio group, it is meant a group comprising a group of formula —S—(C=S)—, such as a Xanthate group, a dithioester group, a dithiocarbamate group, a dithiocarbazate group, or thioether-thione group.

By, organic solvent, it a meant a solvent comprising at least one carbon atom. Thus, the organic solvent is different from pure water. However the solvent may comprise some water, but not more than 50 weight %. It is preferably a pure organic solvent substantially comprising no water.

The polymer is preferably a block copolymer, for example a di-block or a tri-block copolymer. In a preferred embodiment, the block copolymer is obtained by a living polymerization process involving a transfer agent comprising a dithio group such as a Xanthate group, a dithioester group, a dithiocarbamate group, a dithiocarbazate group, or thioether-thione group.

DETAILED DESCRIPTION OF THE INVENTION

Definitions

In the present specification, the molecular weight of a polymer, a copolymer, a moiety, a graft, a side-chain, a core, a branch, a block or a backbone refers to the weight-average molecular weight of said polymer, copolymer, moiety, graft, side-chain, core, branch, block or backbone. The weight-average molecular weight of the polymer or copolymer can be measured by gel permeation chromatography (GPC). In the present specification, the molecular weight of a graft, side-chain, core, branch, block or backbone refers to the molecular weight calculated from the amounts of monomers, polymers, initiators and/or transfer agents used to make the said graft, side-chain, core, branch, block or backbone. The one skilled in the art knows how to calculate these molecular weights. The ratios by weight between blocks refers to the ratios between the amounts of the compounds used to make said moieties, considering an extensive polymerization.

Typically, the molecular weight M of a block, graft, side-chain, branch, core or backbone is calculated according to the following formula:

$$M = \sum_i M_i^* \frac{n_i}{n_{precursor}},$$

wherein $M_i$ is the molecular weight of a monomer i, $n_i$ is the number of moles of a monomer i, and $n_{precusor}$ is the number of moles of a compound the macromolecular chain of the block, graft, side-chain, branch, core or backbone will be linked to. Said compound may be a transfer agent or a transfer group, a previous block, or a graft or reactive side-chain. If it is a previous block, the number of moles may be considered as the number of moles of a compound the macromolecular chain of said previous block has been linked to, for example a transfer agent or a transfer group. It may be also obtained by a calculation from a measured value of the molecular weight of said previous block. If two blocks are simultaneously grown from a previous block, at both ends, the molecular weight calculated according to the above formula should be divided by two.

In the present specification, a unit deriving from a monomer is understood as a unit that may be directly obtained from the said monomer by polymerizing. Thus, a unit deriving from an ester of acrylic or methacrylic acid does not encompass a unit of formula —CH—CH(COOH)—, —CH—C(CH$_3$)(COOH)—, —CH—CH(OH)—, —CH—C (CH$_3$)(OH)—, obtained for example by polymerizing an ester of acrylic or methacrylic acid, or a vinyl acetate, and then hydrolyzing. A unit deriving from acrylic acid or methacrylic acid encompasses for example a unit obtained by polymerizing a monomer (for example an alkyl acrylate or methacylate) and then reacting (for example hydrolyzing) to obtain units of formula —CH—CH(COOH)— or —CH—C(CH$_3$)(COOH)—. A unit deriving from vinyl alcohol encompasses for example a unit obtained by polymerizing a monomer (for example a vinyl ester) and then reacting (for example hydrolyzing) to obtain units of formula —CH—CH(OH)— or —CH—C(CH$_3$)(OH)—.

The process according involves reacting a polymer with an amine compound in an organic solvent. The polymer comprises a dithio group at at least one chain-end.

By polymer, it is meant a macromolecular compound comprising repeating units. The polymer may be as well a homopolymer, a random copolymer, a block copolymer, a comb polymer, a star polymer, a branched polymer, or a dendritic polymer. The dithio group is usually or group that has been involved in the polymerization process, such as a transfer group, that was comprised in a transfer agent. Thus, the transfer comprises a dithio group.

Dithio groups include for example groups of formula —S—(C=S)—R, wherein R is selected from the group consisting of:
an alkyl group, a halogenoalkyl group, a perfluoroalkyl group, an alcenyl group, an alcynyl group, an acyl group, an aryl group, an arylalkyl group, an arylalcenyl group, an arylalcynyl group, a carbon-homocycle group, an heterocycle group, a polymeric chain, a group of formula —OR$^a$, wherein R$^a$ is selected from the group consisting of:
an alkyl group, a halogenoalkyl group, a perfluoroalkyl group, an alcenyl group, an alcynyl group, an acyl group, an aryl group, an arylalkyl group, an arylalcenyl group, an arylalcynyl group, a carbon-homocycle group, a heterocycle group, an polymeric chain, a group of formula —CR$^b$R$^c$PO(OR$^d$)(OR$^e$), wherein:
R$^b$ and R$^c$, which are identical or different, are selected from the group consisting of a hydrogen atom, a halogen atom, a perfluoroalkyl group, a carbon-homocycle group, a heterocycle group, a —NO$_2$ group, a —NCO group, a —CN group, and groups of formula —R$^f$, —SO$_3$R$^f$, —OR$^f$, —SR$^f$, —NR$^f$R$^g$, —OOCR$^f$, —CONR$^f$R$^g$, or —SO$_3$R$^f$, wherein R$^f$ and R$^g$, which are identical or different, are an alkyl group, an alcenyl group, an alcynyl group, an aryl group, an arylalkyl group, arylalcenyl group, or an arylalcynyl group, or R$^b$ and R$^c$ are groups forming together with a carbon atom they are bonded to, a C=O group, a C=S group, a carbon-homocycle group, or a heterocycle group, R$^d$ and R$^e$, which are identical or different, are an alkyl group, an alcenyl group, an alcynyl group, an aryl group, an arylalkyl group, arylalcenyl group, or an arylalcynyl group, or R$^d$ et R$^e$ are groups forming togother a hydrocarbon chain comprising from 2 to 4 carbon atoms, said chain comprising, optionally a —O—, —S—, or —NR$^h$— group, wherein R$^h$ is an alkyl group, an alcenyl group, an alcynyl group, an aryl group, an arylalkyl group, arylalcenyl group, or an arylalcynyl group, a group of formula —NR$^i$R$^j$, wherein:
R$^i$ et R$^j$, which are identical or different, are an alkyl group, a halogenoalkyl group, an alcenyl group, an alcynyl group, an acyl group, an ester group, an aryl group, an arylalkyl group, an arylalcenyl group, an arylalcynyl group, a cyclic group comprising carbon atoms, or —R$^i$ et R$^j$ are groups forming together a hydrocarbon chain comprising from 2 to 4 carbon atoms, said chain comprising, optionally a —O—, —S—, or —NR$^h$— group, wherein R$^h$ is an alkyl group, an alcenyl group, an alcynyl group, an aryl group, an arylalkyl group, arylalcenyl group, or an arylalcynyl group, and a group of formula S—C(S)—NR$^4$—NR$^2$R$^3$, or —S—C(S)—NR$^4$—N=CR$^5$R$^6$, wherein R$^2$R$^3$, R$^4$, R$^5$, and R$^6$, which are identical or different, are hydrogen atoms or an hydrocarbyl group, optionally substituted, or optionally comprising heteroatoms.

Preferred dithio groups include Xanthate groups, dithioester groups, dithiocarbamate groups, thioether-thione groups, groups having a —S—(C=S)—S— group, and dithiocarbazates groups.

Preferred polymers comprise units deriving from ethylenically-unsaturated monomers, for example diene monomers, or mono-ethylenically-unsaturated monomers. Preferred polymers comprise units deriving from mono-apha-ethylenically-unsaturated monomers.

Example of ethylenically-unsaturated monomers include monomers of formula CXX'(=CV—CV')$_b$=CRR'$_2$, wherein:

V, and V', which are identical or different, represent an hydrogen atom, an alkyl group or a halogen atom, X, and X', which are identical or different, represent an hydrogen atom, a halogen atom, or an R", —OR", —OCOR", —NHCOH, —OH, —NH$_2$, —NHR", —N(R")$_2$, H$_2$N$^+$O$^-$, (R")$_2$N$^+$O–, —NHCOR", —CO$_2$H, —CO$_2$R", —CN, —CONH$_2$, —CONHR" or CON(R")$_2$ group, wherein R", which is identical or different is chosen from alkyl, aryl, aralkyl, alkaryl, alkene or organosilyl groups, optionally perfluorinated and optionally substituted with one or more carboxyl, epoxy, hydroxyl, alkoxy, amino, halogen or sulphonic groups, R and R', which are identical or different, represent an hydrogen atom, or a methyl group, at least one of R and R' group being preferably an hydrogen atom, and b is equal to 0 or 1.

Preferred ethylenically-unsaturated monomers are (mono-)alpha-ethylenically-unsaturated polymers, including:

styrene, acrylonitrile, methylacrylate, ethylacrylate, n-propylacrylate, n-butylacrylate, methylmethacrylate, ethylmethacrylate, n-propylmethacrylate, n-butylmethacrylate, 2-ethyl-hexyl acrylate and 2-hydroxyethylacrylate, vinyl alcohol, vinyl acetate, vinyl pyrrolidone, polyethylene oxide (meth)acrylate (i.e. polyethoxylated (meth)acrylic acid), ethylenically-unsaturated monomers comprising a phosphate or phosphonate group, ethylenically-unsaturated monocarboxylic acids, such as acrylic acid, or methacrylic acid, amides of alpha ethylenically unsaturated monomers comprising a carboxylic group, such as acrylamide, or methacrylamide, ethylenically unsaturated compounds comprising a sulphonic acid group, salts of ethylenically unsaturated compounds comprising a sulphonic acid group, such as vinyl sulphonic acid, salts of vinyl sulfonic acid, vinylbenzene sulphonic acid, salts of vinylbenzene sulphonic acid, alpha-acrylamidomethylpropanesulphonic acid, salts of alpha-acrylamidomethylpropanesulphonic acid, 2-sulphoethyl methacrylate, salts of 2-sulphoethyl methacrylate, acrylamido-2-methylpropanesulphonic acid (AMPS), salts of acrylamido-2-methylpropanesulphonic acid, or styrenesulphonate (SS), dimethylaminoethyl(meth)acrylate, dimethylaminopropyl (meth)acrylate, ditertiobutylaminoethyl(meth)acrylate, dimethylaminomethyl(meth)acrylamide, dimethylaminopropyl(meth)acrylamide, ethylenimine, vinylamine, 2-vinylpyridine, 4-vinylpyridine, trimethylammonium ethyl(meth)acrylate chloride, trimethylammonium ethyl (meth)acrylate methyl sulphate, dimethylammonium ethyl(meth)acrylate benzyl chloride, 4-benzoylbenzyl dimethylammonium ethyl acrylate chloride, trimethyl ammonium ethyl (meth)acrylamido chloride, trimethyl ammonium propyl (meth)acrylamido chloride, vinylbenzyl trimethyl ammonium chloride, diallyldimethyl ammonium chloride, and/or the monomers mentioned below, referred to as hydrophilic, hydrophobic, cationic, anionic, and/or neutral, except dialkylsiloxane such as dimethyl siloxane.

The polymer may be a homopolymer comprising units deriving from the above-mentioned monomers, a random copolymer comprising units deriving from at least two of the above-mentioned monomers, a star, branched, or dendritic (co)polymer, or a block copolymer as described below.

According to a particular embodiment, the polymer is a block copolymer comprising at least two blocks, block A and block B. It is for example is a di-block (block A)-(block B), a tri-block (block A)-(block B)-(block A), or a tri-block (block B)-(bloc A)-(block B) copolymer. The block copolymer is preferably a linear block copolymer. By linear it is meant that the blocks arrangement is linear. However, a block may be a block having a comb polymer structure, that is comprising repeating units comprising a polymeric moiety (macromonomers).

Preferably, at least one block at least one block comprises units deriving from the above-mentioned monomers, said block being itself a homopolymer or a random copolymer.

In a particular embodiment, block copolymers are tri-block copolymers, comprising two side blocks and one central block, wherein the central block is a polyorganosiloxane block, and the side block are blocks comprising units deriving form the above mentioned monomers (ethylenically-unsaturated monomers, preferably alpha-ethylenically-unsaturated monomers, more preferably mono-alpha-ethylenically-unsaturated monomers). Such block copolymers, and processes for making them, are for example described in international patent application PCT/FR01/02433, filed on Jul. 25, 2001, which is included by reference.

In another particular embodiment, block copolymers are di-block (block A)-(block B), a tri-block (block A)-(block B)-(block A), or a tri-block (block B)-(bloc A)-(block B) copolymer, wherein both block A and block B comprise units deriving from the above-mentioned monomers, said blocks being themselves a homopolymer or a random copolymer. It is further preferred that at least one block selected from block A and block B, and more preferably both, comprises units deriving from mono-alpha-unsaturated monomers.

Block A and block B are different and present for example different properties as regards to a hydrophilic or hydrophobic nature, or to a neutral or polyionic nature.

For example block A is a hydrophilic neutral, polyanionic, or polycationic block and block B is a hydrophobic neutral block, or block A is hydrophilic polyanionic or polycationic block, and block B is a neutral hydrophilic block.

Hydrophilic or Hydrophobic properties of a block refer to the property said block would have without the other block (s), that is the property of a polymer consisting of the same repeating units than said block, having the same molecular weight. By hydrophilic block, polymer or copolymer, it is meant that the block, polymer or copolymer does not phase separate macroscopically in water at a concentration from 0.01% and 10% by weight, at a temperature from 20° C. to 30° C. By hydrophobic block, polymer or copolymer, it is meant that the block, polymer or copolymer does phase separate macroscopically in the same conditions.

Hydrophobic blocks include blocks comprising repeating units deriving from monomers selected from the group consisting of:

dialkylsiloxane, such as dimethyl siloxane, alkylesters of an alpha-ethylenically-unsaturated, preferably mono-alpha-ethylenically-unsaturated, monocarboxylic acid, such as methylacrylate, ethylacrylate, n-propylacrylate, n-butylacrylate, methylmethacrylate, ethylmethacrylate, n-propylmethacrylate, n-butylmethacrylate, and 2-ethyl-hexyl acrylate, 2-ethylhexyl methacrylate, isooctyl acrylate, isooctyl methacrylate, lauryl acrylate, lauryl methacrylate, vinyl Versatate, acrylonitrile, vinyl nitriles, comprising from 3 to 12 carbon atoms, vinylamine amides, and vinylaromatic compounds such as styrene.

Hydrophilic blocks include blocks comprising repeating units deriving from monomers selected from the group consisting of:

vinyl alcohol, vinyl pyrrolidone, acrylamide, methacrylamide, polyethylene oxide (meth)acrylate (i.e. polyethoxylated (meth)acrylic acid), hydroxyalkylesters of alpha-ethylenically-unsaturated, preferably mono-alpha-ethylenically-unsaturated, monocarboxylic acids, such as 2-hydroxyethylacrylate, and hydroxyalkylamides of alpha-ethylenically-unsaturated, preferably mono-alpha-ethylenically-unsaturated, monocarboxylic acids, dimethylaminoethyl(meth)acrylate, dimethylaminopropyl (meth)acrylate, ditertiobutylaminoethyl(meth)acrylate, dimethylaminomethyl(meth)acrylamide, dimethylaminopropyl(meth)acrylamide;

ethylenimine, vinylamine, 2-vinylpyridine, 4-vinylpyridine;

trimethylammonium ethyl(meth)acrylate chloride, trimethylammonium ethyl (meth)acrylate methyl sulphate, dimethylammonium ethyl(meth)acrylate benzyl chloride, 4-benzoylbenzyl dimethylammonium ethyl acrylate chloride, trimethyl ammonium ethyl (meth)acrylamido (also called 2-(acryloxy)ethyltrimethylammonium, TMAEAMS) chloride, trimethylammonium ethyl(meth)acrylate (also called 2-(acryloxy)ethyltrimethylammonium, TMAEAMS) methyl sulphate, trimethyl ammonium propyl (meth)acrylamido chloride, vinylbenzyl trimethyl ammonium chloride, diallyldimethyl ammonium chloride, monomers having the following formula:

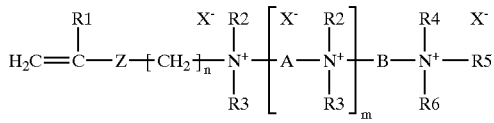

wherein $R_1$ is a hydrogen atom or a methyl or ethyl group;

$R_2$, $R_3$, $R_4$, $R_5$ and $R_6$, which are identical or different, are linear or branched $C_1$–$C_6$, preferably $C_1$–$C_4$, alkyl, hydroxyalkyl or aminoalkyl groups;

m is an integer from 1 to 10, for example 1;

n is an integer from 1 to 6, preferably 2 to 4;

Z represents a —C(O)O— or —C(O)NH— group or an oxygen atom;

A represents a $(CH_2)_p$ group, p being an integer from 1 to 6, preferably from 2 to 4;

B represents a linear or branched $C_2$–$C_{12}$, advantageously $C_3$–$C_6$, polymethylene chain optionally interrupted by one or more heteroatoms or heterogroups, in particular O or NH, and optionally substituted by one or more hydroxyl or amino groups, preferably hydroxyl groups;

X, which are identical or different, represent counterions, alpha-ethylenically-unsaturated, preferably mono-alpha-ethylenically-unsaturated, monomers comprising a phosphate or phosphonate group, alpha-ethylenically-unsaturated, preferably mono-alpha-ethylenically-unsaturated, monocarboxylic acids, such as acrylic acid, methacrylic acid monoalkylesters of alpha-ethylenically-unsaturated, preferably mono-alpha-ethylenically-unsaturated, dicarboxylic acids, monoalkylamides of alpha-ethylenically-unsaturated, preferably mono-alpha-ethylenically-unsaturated, dicarboxylic acids, alpha-ethylenically-unsaturated, preferably mono-alpha-ethylenically-unsaturated, compounds comprising a sulphonic acid group, and salts of alpha-ethylenically-unsaturated, preferably mono-alpha-ethylenically-unsaturated, compounds comprising a sulphonic acid group, such as vinyl sulphonic acid, salts of vinyl sulfonic acid, vinylbenzene sulphonic acid, salts of vinylbenzene sulphonic acid, alpha-acrylamidomethylpropanesulphonic acid, salts of alpha-acrylamidomethylpropanesulphonic acid 2-sulphoethyl methacrylate, salts of 2-sulphoethyl methacrylate, acrylamido-2-methylpropanesulphonic acid (AMPS), salts of acrylamido-2-methylpropanesulphonic acid, and styrenesulfonate (SS).

As regard to a neutral or polyionic nature of a block, it may depend on pH conditions. By polyionic it is meant that the block comprises ionic (anionic or cationic) repeating units, or that the block comprises repeating units that may be neutral or ionic (anionic or cationic) depending on pH (the units are potentially ionic). A unit that may be neutral or ionic (anionic or cationic), depending on the pH, is thereafter referred as an ionic unit (anionic or cationic), or as a unit deriving from an ionic monomer (anionic or cationic), whatever it is in a neutral form or in an ionic form (anionic or cationic).

Examples of polycationic blocks are blocks comprising units deriving from monomers selected from the group consisting of:

aminoalkyl(meth)acrylates, aminoalkyl(meth)acrylamides, monomers, including particularly (meth)acrylates, and (meth)acrylamides derivatives, comprising at least one secondary, tertiary or quaternary amine function, or a heterocyclic group containing a nitrogen atom, vinylamine or ethylenimine;

diallyldialkyl ammonium salts;

their mixtures, their salts, and macromonomers deriving from therefrom.

Examples of cationic monomers include:

dimethylaminoethyl(meth)acrylate, dimethylaminopropyl (meth)acrylate, ditertiobutylaminoethyl(meth)acrylate, dimethylaminomethyl(meth)acrylamide, dimethylaminopropyl(meth)acrylamide;

ethylenimine, vinylamine, 2-vinylpyridine, 4-vinylpyridine;

trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido (also called 2-(acryloxy)ethyltrimethylammonium, TMAEAMS) chloride, trimethylammonium ethyl (meth)

acrylate (also called 2-(acryloxy)ethyltrimethyl-ammonium, TMAEAMS) methyl sulphate, trimethyl ammonium propyl(meth)acrylamido chloride, vinylbenzyl trimethyl ammonium chloride,
diallyldimethyl ammonium chloride,
monomers having the following formula:

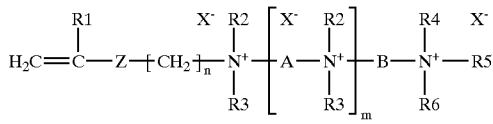

wherein
$R_1$ is a hydrogen atom or a methyl or ethyl group;
$R_2$, $R_3$, $R_4$, $R_5$ and $R_6$, which are identical or different, are linear or branched $C_1$–$C_6$, preferably $C_1$–$C_4$, alkyl, hydroxyalkyl or aminoalkyl groups;
m is an integer from 1 to 10, for example 1;
n is an integer from 1 to 6, preferably 2 to 4;
Z represents a —C(O)O— or —C(O)NH— group or an oxygen atom;
A represents a $(CH_2)_p$ group, p being an integer from 1 to 6, preferably from 2 to 4;
B represents a linear or branched $C_2$–$C_{12}$, advantageously $C_3$–$C_6$, polymethylene chain optionally interrupted by one or more heteroatoms or heterogroups, in particular O or NH, and optionally substituted by one or more hydroxyl or amino groups, preferably hydroxyl groups;
X, which are identical or different, represent counterions, and
their mixtures, and macromonomers deriving therefrom.

Examples of polyanionic blocks include blocks comprising units deriving from monomers selected from the group consisting of:

alpha-ethylenically-unsaturated monomers comprising a phosphate or phosphonate group,
alpha-ethylenically-unsaturated monocarboxylic acids,
monoalkylesters of alpha-ethylenically-unsaturated dicarboxylic acids,
monoalkylamides of alpha-ethylenically-unsaturated dicarboxylic acids,
alpha-ethylenically-unsaturated compounds comprising a sulphonic acid group, and salts of alpha-ethylenically-unsaturated compounds comprising a sulphonic acid group.

Preferred anionic blocks include blocks comprising deriving from at least one anionic monomer selected from the group consisting of:

acrylic acid, methacrylic acid,
vinyl sulphonic acid, salts of vinyl sulfonic acid,
vinylbenzene sulphonic acid, salts of vinylbenzene sulphonic acid,
alpha-acrylamidomethylpropanesulphonic acid, salts of alpha-acrylamidomethylpropanesulphonic acid
2-sulphoethyl methacrylate, salts of 2-sulphoethyl methacrylate,
acrylamido-2-methylpropanesulphonic acid (AMPS), salts of acrylamido-2-methylpropanesulphonic acid, and
styrenesulfonate (SS).

Examples of neutral blocks include blocks comprising units deriving from at least one monomer selected from the group consisting of:

acrylamide, methacrylamide,
amides of alpha-ethylenically-unsaturated, preferably mono-alpha-ethylenically-unsaturated, monocarboxylic acids,
esters of an alpha-ethylenically-unsaturated, preferably mono-alpha-ethylenically-unsaturated, monocarboxylic acid, for example alkyl esters such as such as methylacrylate, ethylacrylate, n-propylacrylate, n-butylacrylate, methylmethacrylate, ethylmethacrylate, n-propylmethacrylate, n-butylmethacrylate, 2-ethyl-hexyl acrylate, or hydroxyalkyl esters such as 2-hydroxyethylacrylate,
polyethylene and/or polyporpylene oxide (meth)acrylates (i.e. polyethoxylated and/or polypropoxylated (meth) acrylic acid),
vinyl alcohol,
vinyl pyrrolidone,
vinyl acetate, vinyl Versatate,
vinyl nitriles, preferably comprising from 3 to 12 carbon atoms,
acrylonitrile,
vinylamine amides,
vinyl aromatic compounds, such as styrene, and
mixtures thereof.

Polymers comprising a dithio group at at least one chain-end, are usually obtained by a living or controlled free-radical polymerization process. Such a process comprises the step of:

a) polymerizing monomers by a living radical polymerization involving a transfer agent comprising a dithio group, to obtain a polymer or a copolymer comprising a dithio group at at least one chain-end.
The polymer comprising a dithio group at at least one chain-end, is then reacted (step b)) with an amine compound, different from triethanol amine, in an organic solvent, according to the invention.

Examples of monomers are ethylenically-unsaturated monomers, preferably mono-alpha-ethylenically-unsaturated monomers, mentioned above.

According to this process block copolymers may be obtained by a process comprising the steps of:
1a) as a first implementation, reacting (polymerization) to obtain a first block:
at least one ethylenically-unsaturated monomer, preferably a mono-alpha-ethylenically-unsaturated monomer,
at least one source of free radicals, and
the transfer agent
2a) as one or more further implementation(s), repeating step 1a) at least once, to obtain a block copolymer comprising the first block and one or more further block(s), with:
using different monomers from the preceding implementation, and
instead reacting the transfer agent, reacting the polymer or block copolymer resulting from the preceding implementation, and
optionally not using further source of free radicals, or using a different source of free radicals.
This process is especially suitable for making block copolymers, wherein the blocks comprise units deriving from mono-alpha-ethylenically-unsaturated monomers.
Polymerizing may be carried out according to a latex polymerization process, involving an emulsion of hydrophobic monomers in water. It may also be carried out according to a bulk, or neat process, without any solvent or phase separation. According to an advantageous process, polymerizing carried out in solution, in a polymerization solvent wherein the monomers and the polymer obtained are soluble. The polymerization solvent and the organic solvent wherein the reaction with the amine compound is performed are preferably the same. According to this preferred process, the amine compound is added to the polymer in the solvent after the polymerization is completed (step b)).

Transfer agents that may be used include compounds comprising a Xanthate group, a dithioester group, a dithiocarbamate group, a thioether-thione group, or a trithiocarbonate group.

The transfer agent is preferably of the following formula (I):

$$R^1\text{—}S\text{—}(C{=}S)\text{—}R \qquad (I),$$

wherein:

$R^1$ is
- an alkyl, acyl, aryl, alkene or alkyne group, optionally substituted,
- a carbonaceous ring, saturated or unsaturated, optionally substituted or aromatic, or
- a saturated or unsaturated heterocycle, optionally substituted, or a polymer chain, and R is selected from the group consisting of:
- an alkyl group, a halogenoalkyl group, a perfluoroalkyl group, an alcenyl group, an alcynyl group, an acyl group, an aryl group, an arylalkyl group, an arylalcenyl group, an arylalcynyl group, a carbon-homocycle group, an heterocycle group, a polymeric chain,
- a group of formula —OR$^a$, wherein R$^a$ is selected from the group consisting of:
    - an alkyl group, a halogenoalkyl group, a perfluoroalkyl group, an alcenyl group, an alcynyl group, an acyl group, an aryl group, an arylalkyl group, an arylalcenyl group, an arylalcynyl group, a carbon-homocycle group, a heterocycle group, an polymeric chain,
- a group of formula —CR$^b$R$^c$PO(OR$^d$)(OR$^e$), wherein:
    - R$^b$ and R$^c$, which are identical or different, are selected from the group consisting of a hydrogen atom, a halogen atom, a perfluoroalkyl group, a carbon-homocycle group, a heterocycle group, a —NO$_2$ group, a —NCO group, a —CN group, and groups of formula —R$^f$, —SO$_3$R$^f$, —OR$^f$, —SR$^f$, —NR$^f$R$^g$, —OOCR$^f$, —CONR$^f$R$^g$, or —SO$_3$R$^f$, wherein R$^f$ and R$^g$, which are identical or different, are an alkyl group, an alcenyl group, an alcynyl group, an aryl group, an arylalkyl group, arylalcenyl group, or an arylalcynyl group, or
    - R$^b$ and R$^c$ are groups forming together with a carbon atom they are bonded to, a C═O group, a C═S group, a carbon-homocycle group, or a heterocycle group,
    - R$^d$ and R$^e$, which are identical or different, are an alkyl group, an alcenyl group, an alcynyl group, an aryl group, an arylalkyl group, arylalcenyl group, or an arylalcynyl group, or
    - R$^d$ et R$^e$ are groups forming togother a hydrocarbon chain comprising from 2 to 4 carbon atoms, said chain comprising, optionally a —O—, —S—, or —NR$^h$— group, wherein R$^h$ is an alkyl group, an alcenyl group, an alcynyl group, an aryl group, an arylalkyl group, arylalcenyl group, or an arylalcynyl group, a group of formula —NR$^i$R$^j$, wherein:
- R$^i$ et R$_j$, which are identical or different, are an alkyl group, a halogenoalkyl group, an alcenyl group, an alcynyl group, an acyl group, an ester group, an aryl group, an arylalkyl group, an arylalcenyl group, an arylalcynyl group, a cyclic group comprising carbon atoms, or
- R$^i$ et R$^j$ are groups forming together a hydrocarbon chain comprising from 2 to 4 carbon atoms, said chain comprising, optionally a —O—, —S—, or —NR$^h$— group, wherein R$^h$ is an alkyl group, an alcenyl group, an alcynyl group, an aryl group, an arylalkyl group, arylalcenyl group, or an arylalcynyl group a group of formula S—C(S)—NR$^4$—NR$^2$R$^3$, or —S—C(S)—NR$^4$—N═CR$^5$R$^6$, wherein R$^2$, R$^3$, R$^4$, R$^5$, and R$^6$, which are identical or different, are hydrogen atoms or an hydrocarbyl group, optionally substituted, optionally comprising heteroatoms.

The transfer agent is for example selected from the group consisting of transfer agents of the following formulae (IA), (IB), (IC):

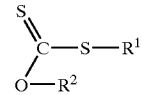

(IA)

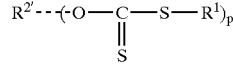

(IB)

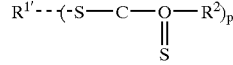

(IC)

wherein:

$R^2$ and $R^{2'}$, which are identical or different, are an alkyl group, a halogenoalkyl group, a perfluoroalkyl group, an alcenyl group, an alcynyl group, an acyl group, an aryl group, an arylalkyl group, an arylalcenyl group, an arylalcynyl group, a carbon-homocycle group, or a heterocycle group, $R^1$ and $R^{1'}$, which are identical or different are:
- an alkyl, acyl, aryl, alkene or alkyne group, optionally substituted,
- a carbonaceous ring, saturated or unsaturated, optionally subsituted or aromatic, or
- a saturated or unsaturated heterocycle, optionally substituted, or a polymer chain, and p is between 2 and 10.

Sources of free radicals are known by the one skilled in the are, and include for example azo-bis-isobutylnitrile (AIBN).

The process according to the invention is especially useful for polymers comprising units that are sensible to hydrolysis conditions, such as units deriving from vinyl acetate, and (meth)acrylic acid esters, for example methylacrylate, ethylacrylate, n-propylacrylate, n-butylacrylate, methylmethacrylate, ethylmethacrylate, n-propylmethacrylate, n-butylmethacrylate, 2-ethyl-hexyl acrylate and 2-hydroxyethylacrylate. These units may be units of a homopolymer, a random copolymer or of a block of a block copolymer. They may be comprised for example in block B of the above mentioned di-block or tri-block copolymers. Thus, block B preferably comprises units deriving from (meth)acrylic acid esters (esters of acrylic acid or methacrylic acid). The process according to the invention avoids hydrolysis of these units when it is not intended to alter them, while allowing removal of the dithio group.

According to a particular embodiment, the polymer comprises repeating units comprising a labile proton, the proton being attached to said unit in the solvent, and being detached when a basic compound is added to the solvent, said process comprising introducing a basic compound in the solvent. The labile proton is for example comprised in a weak acid group, such as a carboxylic group —COOH, or a sulfonic group —$SO_3H$. Units comprising a labile proton include units deriving from acrylic acid or methacrylic acid.

The amount of basic compound, in molar base equivalent, is preferably greater than or equal to the amount of labile protons comprised in the polymer. Suitable basic compounds include any strong base compounds, which are preferably soluble in the organic solvent, for example hydroxide salts.

In a preferred embodiment, the amine compound is a basic compound. In this embodiment, no further basic compound is added, other than the amine compound. Examples of basic amine compounds include ammonia, and salts of a quaternary ammonium and a basic anion, such as ammonium hydroxide. According to this embodiment, the amount of amine compound is both greater than or equal to, in amine molar equivalent, the amount of dithio groups, and greater than or equal to, in molar base equivalent, the amount of labile protons in the polymer.

It is preferred that the polymer is not soluble in the solvent when protons are detached, for example in presence of an amine compound such as a basic amine compound. In these conditions the polymer may precipitate, and ease separating the polymer and the undesired dithio groups reaction by-products that are soluble in the solvent. These by-products remain in the solvent. The polymer may then be recovered in a solid form, free of the colored and/or smelly by-product. The process according to the preferred embodiment is thus particularly simple and useful.

The units comprising a labile proton, the proton being attached to said unit in the solvent, and being detached in presence of the amine compound, may be units of a homopolymer, a random copolymer or of a block of a block copolymer. They may be comprised for example in block A of the above mentioned di-block or tri-block copolymers. Block A thus advantageously comprises units deriving from meth(acrylic) acid.

It is further mentioned that the embodiment wherein the polymer comprises units sensible to hydrolysis and the embodiment wherein the polymer comprises units comprising a labile proton may be combined. The polymer may be for example a random copolymer comprising both unit types, or a block copolymer wherein different blocks comprise different unit types. The polymer is thus preferably a block copolymer wherein block A comprises units deriving from acrylic acid or methacrylic acid, and block B comprises units deriving from (meth)acrylate monomers, such as butyl acrylate or methyl methacrylate.

The amine compound is different from triethanol amine. It is advantageously soluble in the organic solvent, as well as the polymer. Preferred amine compounds include ammonia and inorganic amine compounds, such as ammonium salts.

The amount of amine being used, in amine molar equivalent, is preferably greater than the amount of dithio groups of the polymer.

According to a preferred embodiment, especially useful for polymers comprising labile protons, the amine compound is a basic compound, such as ammonia, or ammonium hydroxide. According to this embodiment, the amount of amine compound is both greater than or equal to, in amine molar equivalent, the amount of dithio groups, and greater than or equal to, in molar base equivalent, the amount of labile protons in the polymer. The polymer may precipitate in the presence of such an amine compound. Thus, according to this embodiment, as dithio reaction by-products are soluble in the solvent, undesired by-products remain in the solvent, while the precipitated polymer is substantially free of said by-products.

The solvent is an organic solvent comprising at least one carbon atom. The polymer is preferably soluble in the solvent, the reaction being performed in solution conditions. It is also preferred that the amine compound is soluble in the solvent. Thus polar solvent are preferred.

Examples of suitable polar organic solvent include ethanol and tetrahydrofuran (THF). The solvent preferably essentially consists of substantially pure ethanol or tetrahydrofuran. Reaction by-products are usually soluble in these solvents and remain in dissolved in them. Thus, according to the embodiment wherein the polymer precipitates, undesired by-products remain in the solvent, while the precipitated polymer is substantially free of said colored and smelly by-products.

The reaction of the polymer and the amine compounds, in the solvent, is preferably carried out in mild temperature conditions, without water, preferably between 21° C. and 80° C. Such temperatures avoid any polymer alteration, for example by hydrolysis reaction.

Concrete but non-limiting examples of the invention are presented below.

EXAMPLES

Example 1

Synthesis of a Di-Block Copolymer $p(BA)_{1000}$-b-p $(AA)_{4000}$ (Polybutylacrylate Block Polyacrylic Acid)

Stage 1: Synthesis of a Monoblock $P(BA)_{1000}$-X

Ingredients

| | |
|---|---|
| Ethanol | 23.00 g. |
| Butyl Acrylate | 8.00 g. |
| Xanthate A (O-ethyldithiocarbamate) | 1.664 g. |
| AIBN (Azo-bis-isobutylnitrile) | 0.263 g. |

Procedure

The above ingredients are charged into a 250-ml polymerization bottle with a magnetic stirrer-bar. After sealing the cap with the rubber septum, the contents are bubbled through dry nitrogen for 20 minutes, then heated to 60° C. and held at this temperature for 20 hours. Small amount of sample is withdrawn to check the conversion. The solid content is 30.2%.

Stage 2: Synthesis of a Di-Block Copolymer p(BA)$_{1000}$-b-p(AA)$_{4000}$-X
Ingredients

| | |
|---|---|
| Ethanol | 75.00 g. |
| Acrylic Acid | 32.00 g. |
| AIBN (Azo-bis-isobutylnitrile) | 0.263 g. |

Procedure

The above ingredients are charged into a dry flask and bubbled through dry nitrogen for 20 minutes. Then, they are transferred into the polymerization bottle of stage 1 by a double-tipped needle. After the introduction of the feed is completed, the reaction mixture is held at 60° C. for another 20 hours. The conversion is checked by the solid content. The solid content is 30%.

Stage 3: Removal of the Xanthate Group X to Obtain a Di-Block p(BA)$_{1000}$-b-P(AA)$_{4000}$
Ingredients

| | |
|---|---|
| di-block copolymer Solution obtained in stage 2 | 40 g. |
| Ammonium Hydroxide (28%) | 57.25 g. |

Procedures 40 grams of the di-block copolymer solution (30% solid content) are placed in a 250 ml of round-bottom flask with mechanical stirrer and dropping funnel. 57.25 grams of ammonium hydroxide (28%) inside of dropping funnel are gradually added into the stirring flask. Polymer starts to precipitate out from the solution. After stirring for 4 hours, supernatant is removed and the precipitated polymer is washed by small amount ethanol twice. The isolated polymer is dried in vacuum overnight at 60° C. A $^{13}$C-NMR analysis before and after stage 3 shows a decomposition of the dithio group and no hydrolysis of butyl acrylate segment of the di-block copolymer. It is white, and does not smell bad.

Example 2

Synthesis of a Random Copolymer p[(BA)$_{1000}$-(AA)$_{4000}$]

Stage 1: Synthesis of a Random Copolymer p[(BA)$_{1000}$-(AA)$_{4000}$]-X
Ingredients

| | |
|---|---|
| Ethanol | 98.00 g. |
| Butyl Acrylate | 8.00 g. |
| Acrylic Acid | 32.00 g. |
| Xanthate A (O-ethyldithiocarbomate) | 1.664 g. |
| AIBN (Azo-bis-isobutylnitrile) | 0.526 g. |

Procedure

The above ingredients are charged into a 250-ml polymerization bottle with a magnetic stirrer-bar. After sealing the cap with the rubber septum, the contents are bubbled through dry nitrogen for 20 minutes, then heated to 60° C. and held at this temperature for 20 hours. Small amount of sample is withdrawn to check the conversion. The solid content is 30%.

Stage 2: Removal of the Xanthate Group X to Obtain a Random p[(BA)$_{1000}$-(AA)$_{4000}$]
Ingredients

| | |
|---|---|
| Random copolymer solution obtained in stage 1 | 40 g. |
| Ammonium Hydroxide (28%) | 57.25 g. |

Procedure 40 grams of the random copolymer solution (30% solid content) are placed in a 250 ml of round-bottom flask with mechanical stirrer and dropping funnel. 57.25 grams of ammonium hydroxide (28%) inside of dropping funnel is gradually added into the stirring flask. Polymer starts to precipitate out from the solution. After stirring for 4 hours, supernatant is removed and the precipitated polymer is washed by small amount ethanol twice. The isolated polymer is dried in vacuum overnight at 60° C. A $^{13}$C-NMR analysis before and after stage 3 shows a decomposition of the dithio group and no hydrolysis of butyl acrylate units of the random copolymer.

What is claimed is:

1. A process for removing a dithio group having a group of formula —S—(C=S)—, comprised at the end of a block polymer chain, comprising units deriving from ethylenically unsaturated monomers, said process comprising the step of reacting the polymer comprising a dithio group at at least one chain-end, with an amine compound, different from triethanol amine, in an organic solvent.

2. A process according to claim 1, wherein the amine compound is an inorganic amine compound.

3. A process according to claim 2, wherein the amine compound is ammonia, or an ammonium salt.

4. A process according to claim 1, wherein the solvent is polar solvent, the polymer being soluble in the solvent, and the amine compound being soluble in the solvent.

5. A process according to claim 4, wherein the polymer comprises repeating units comprising a labile proton, the proton being attached to said unit in the solvent, and being detached when a basic compound is added to the solvent, said process comprising introducing a basic compound in the solvent.

6. A process according to claim 5, wherein the basic compound is the amine compound.

7. A process according to claim 6, wherein the amine compound is ammonium hydroxide.

8. A process according to claim 5, wherein the polymer is not soluble in the solvent when the proton is detached.

9. A process according to claim 8, wherein the polymer precipitates in presence of the amine compound.

10. A process according to claim 9, wherein dithio reaction by-products comprising the dithio group are soluble in the solvent, do not precipitate with the polymer, and remain in the solvent.

11. A process according to claim 10, further comprising the steps of separating the precipitated polymer from the solvent and recovering the polymer in a solid form.

12. A process according to claim 5, wherein the repeating units comprising a labile proton are (meth)acrylic acid units.

13. A process according to claim 5, wherein the amount of amine, in amine molar equivalent, is greater than or equal to the amount of dithio groups, and the amount of basic compound, in molar base equivalent, is greater than or equal to the amount of labile protons in the polymer.

14. A process according to claim 1, wherein the polymer is a block copolymer comprising at least two blocks, block 15. A process according to claim 1, wherein the polymer is a block copolymer comprising at least two blocks, block A and block B, wherein block B comprises units deriving from (meth)acrylic acid esters.

16. A process according to claim 9, wherein the polymer is a di-block (block A)-(block B), a tri-block (block A)-(block B)-(block A), or a tri-block (block B)-(block A)-(block B) copolymer, wherein block A comprises units deriving from (meth)acrylic acid, and block B comprises units deriving from (meth)acrylic acid esters.

17. A process according to claim 16, wherein the reaction is carried out in a polar organic solvent, the polymer being soluble in the solvent, the amine compound being ammonia or an ammonium salt soluble in the solvent.

18. A process according to claim 17, wherein the solvent comprises ethanol or tetrahydrofuran.

19. A process according to claim 1, wherein the dithio group is a group of formula —S—(C=S)—R, wherein R is selected from the group consisting of:

an alkyl group, a halogenoalkyl group, a perfluoroalkyl group, an alcenyl group, an alcynyl group, an acyl group, an aryl group, an arylalkyl group, an arylalcenyl group, an arylalcynyl group, a carbon-homocycle group, an heterocycle group, a polymeric chain, a group of formula —OR$^a$, wherein R$^a$ is selected from the group consisting of:

alkyl group, a halogenoalkyl group, a perfluoroalkyl group, an alcenyl group, an alcynyl group, an acyl group, an aryl group, an arylalkyl group, an arylalcenyl group, an arylalcynyl group, a carbon-homocycle group, a heterocycle group, an polymeric chain, a group of formula —CR$^b$R$^c$PO(OR$^d$)(OR$^e$), wherein:

R$^b$ and R$^c$, which are identical or different, are selected from the group consisting of a hydrogen atom, a halogen atom, a perfluoroalkyl group, a carbon-homocycle group, a heterocycle group, a —NO$_2$ group, a —NCO group, a —CN group, and groups of formula —R$^f$, —SO$_3$R$^f$, —OR$^f$, —SR$^f$, —NR$^f$R$^g$, —OOCR$^f$, —CONR$^f$R$^g$, or —SO$_3$R$^f$, wherein R$^f$ and R$^g$, which are identical or different, are an alkyl group, an alcenyl group, an alcynyl group, an aryl group, an arylalkyl group, arylalcenyl group, or an arylalcynyl group, or R$^b$ and R$^c$ are groups forming together with a carbon atom they are bonded to, a C=O group, a C=S group, a carbon-homocycle group, or a heterocycle group, R$^d$ and R$^e$, which are identical or different, are an alkyl group, an alcenyl group, an alcynyl group, an aryl group, an arylalkyl group, arylalcenyl group, or an arylalcynyl group, or R$^d$ et R$^e$ are groups forming togother a hydrocarbon chain comprising from 2 to 4 carbon atoms, said chain comprising, optionally a —O—, —S—, or —NR$^h$— group, wherein R$^h$ is an alkyl group, an alcenyl group, an alcynyl group, an aryl group, an arylalkyl group, arylalcenyl group, or an arylalcynyl group, a group of formula —NR$^i$R$^j$, wherein:

R$^i$ et R$^j$, which are identical or different, are an alkyl group, a halogenoalkyl group, an alcenyl group, an alcynyl group, an acyl group, an ester group, an aryl group, an arylalkyl group, an arylalcenyl group, an arylalcynyl group, a cyclic group comprising carbon atoms, or R$^i$ et R$^j$ are groups forming together a hydrocarbon chain comprising from 2 to 4 carbon atoms, said chain comprising, optionally a —O—, —S—, or —NR$^h$—group, wherein R$^h$ is an alkyl group, an alcenyl group, an alcynyl group, an aryl group, an arylalkyl group, arylalcenyl group, or an arylalcynyl group, and a group of formula —S—C(S)—NR$^4$—NR$^2$R$^3$, or —S—C(S)—NR$^4$—N=CR$^5$R$^6$, wherein R$^2$, R$^3$, R$^4$, R$^5$, and R$^6$, which are identical or different, are hydrogen atoms or an hydrocarbyl group, optionally substituted, or optionally comprising heteroatoms.

20. A process according to claim 1, wherein the dithio group is selected from the group consisting of Xanthate groups, dithioester groups, dithiocarbamate groups, thioether-thione groups, groups having —S—(C=S)—S— groups, and dithiocarbazates groups.

21. A process according to claim 1, wherein the polymer is obtained by a process comprising the steps of:

a) polymerizing monomers by a living radical polymerization involving a transfer agent comprising a dithio group, to obtain a polymer or a copolymer comprising a dithio group at at least one chain-end, and b) reacting the polymer comprising a dithio group at at least one chain-end, with an amine compound, different from triethanol amine, in an organic solvent.

22. A process according to claim 21, wherein the polymerization is carried out in a polymerization solvent wherein the monomers and the polymer are soluble.

23. A process according to claim 21, wherein the organic solvent and the polymerization solvent are the same.

24. A process according to claim 21, wherein the transfer agent is selected from the group consisting of compounds comprising a Xanthate group, a dithioester group, a dithiocarbamate group, a thioether-thione group, a group having a —S—(C=S)—S— group, or a dithiocarbazate group.

25. A process according to claim 21, wherein the transfer agent is of formula (I)

$$R^1-S-(C=S)-R \qquad (I),$$

wherein:

R$^1$ is an alkyl, acyl, aryl, alkene or alkyne group, optionally substituted, a carbonaceous ring, saturated or unsaturated, optionally substituted or aromatic, or a saturated or unsaturated heterocycle, optionally substituted, or a polymer chain, and R is selected from the group consisting of:

an alkyl group, a halogenoalkyl group, a perfluoroalkyl group, an alcenyl group, an alcynyl group, an acyl group, an aryl group, an arylalkyl group, an arylalcenyl group, an arylalcynyl group, a carbon-homocycle group, an heterocycle group, a polymeric chain, a group of formula —OR$^a$, wherein R$^a$ is selected from the group consisting of:

an alkyl group, a halogenoalkyl group, a perfluoroalkyl group, an alcenyl group, an alcynyl group, an acyl group, an aryl group, an arylalkyl group, an arylalcenyl group, an arylalcynyl group, a carbon-homocycle group, a heterocycle group, an polymeric chain, a group of formula —CR$^b$R$^c$PO(OR$^d$)(OR$^e$), wherein:

R$^b$ and R$^c$, which are identical or different, are selected from the group consisting of a hydrogen atom, a halogen atom, a perfluoroalkyl group, a carbon-homocycle group, a heterocycle group, a —NO₂ group, a —NCO group, a —CN group, and groups of formula —R$^f$, —SO₃R$^f$, —OR$^f$, —SR$^f$, —NE$^f$R$^g$, —OOCR$^f$, —CONR$^f$R$^g$, or —SO₃R$^f$, wherein R$^f$ and R$^g$, which are identical or different, are an alkyl group, an alcenyl group, an alcynyl group, an aryl group, an arylalkyl group, arylalcenyl group, or an arylalcynyl group, or R$^b$ and R$^c$ are groups forming together with a carbon atom they are bonded to, a C=O group, a C=S group, a carbon-homocycle group, or a heterocycle group, R$^d$ and R$^e$, which are identical or different, are an alkyl group, an alcenyl group, an alcynyl group, an aryl group, an arylalkyl group, arylalcenyl group, or an arylalcynyl group, or R$^d$ et R$^e$ are groups forming togother a hydrocarbon chain comprising from 2 to 4 carbon atoms, said chain comprising, optionally a —O—, —S—, or —NR$^h$— group, wherein R$^h$ is an alkyl group, an alcenyl group, an alcynyl group, an aryl group, an arylalkyl group, arylalcenyl group, or an arylalcynyl group, and a group of formula —NR$^i$R$^j$, wherein:

R$^i$ et R$^j$, which are identical or different, are an alkyl group, a halogenoalkyl group, an alcenyl group, an alcynyl group, an acyl group, an ester group, an aryl group, an arylalkyl group, an arylalcenyl group, an arylalcynyl group, a cyclic group comprising carbon atoms, or R$^i$ et R$^j$ are groups forming together a hydrocarbon chain comprising from 2 to 4 carbon atoms, said chain comprising, optionally a —O—, —S—, or —NR$^h$— group, wherein R$^h$ is an alkyl group, an alcenyl group, an alcynyl group, an aryl group, an arylalkyl group, arylalcenyl group, or an arylalcynyl group, and a group of formula S—C(S)—NR⁴—NR²R³, or —S—C(S)—NR⁴—N=CR⁵R⁶, wherein R², R³, R⁴, R⁵, and R⁶, which are identical or different, are hydrogen atoms or an hydrocarbyl group, optionally substituted, optionally comprising heteroatoms.

26. A process according to claim 25, wherein the transfer agent is selected from the group consisting of transfer agents of the following formulae (IA), (IB), (IC)

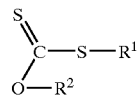
(IA)

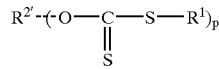
(IB)

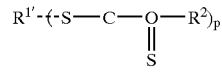
(IC)

wherein:

R² and R²', which are identical or different, are an alkyl group, a halogenoalkyl group, a perfluoroalkyl group, an alcenyl group, an alcynyl group, an acyl group, an aryl group, an arylalkyl group, an arylalcenyl group, an arylalcynyl group, a carbon-homocycle group, or a heterocycle group, R¹ and R¹', which are identical or different are:

an alkyl, acyl, aryl, alkene or alkyne group, optionally substituted, a carbonaceous ring, saturated or unsaturated, optionally subsituted or aromatic, or a saturated or unsaturated heterocycle, optionally substituted, or a polymer chain, and p is between 2and 10.

27. A process according to claim 21, wherein the polymer is a block copolymer, comprising at least two blocks, step a) comprising the steps of:

1a) as a first implementation, reacting to obtain a first block:
at least one ethylenically-unsaturated monomer,
at least one source of free radicals, and
the transfer agent, and 2a) as one or more further implementation(s), repeating step 1a) at least once, to obtain a block copolymer comprising the first block and one or more further block(s), with:
using different monomers from the preceding implementation, and
instead reacting the transfer agent, reacting the polymer or block copolymer resulting from the preceding implementation, and
optionally not using further source of free radicals, or using a different source of free radicals.

28. A process according to claim 27, wherein the block copolymer is a di-block (block A)-(block B), a tri-block (block A)-(block B)-(block A), or a tri-block (block B)-(block A)-(block B) copolymer, wherein at least one block selected from block A and block B comprises units deriving from mono-alpha-ethylenically-unsaturated monomers.

29. A process according to claim 28, wherein block A and block B comprise units deriving from mono-alpha-ethylenically-unsaturated monomers.

* * * * *